United States Patent
Tsuji et al.

(10) Patent No.: US 7,807,085 B2
(45) Date of Patent: Oct. 5, 2010

(54) MANUFACTURING APPARATUS OF PLUGGED HONEYCOMB STRUCTURE AND MANUFACTURING METHOD OF THE SAME

(75) Inventors: Hiroyuki Tsuji, Nagoya (JP); Yoshimasa Kondo, Nagoya (JP); Takeshi Tokunaga, Nagoya (JP); Toshio Oda, Kiyosu (JP); Shinya Yoshida, Nagoya (JP); Takayuki Ogata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/408,921

(22) Filed: Mar. 23, 2009

(65) Prior Publication Data

US 2009/0243139 A1    Oct. 1, 2009

(30) Foreign Application Priority Data

Mar. 26, 2008   (JP)   ............................. 2008-080451

(51) Int. Cl.
B29C 45/14 (2006.01)
B29C 26/36 (2006.01)
B28C 7/16 (2006.01)
B28B 21/54 (2006.01)
B23K 26/36 (2006.01)

(52) U.S. Cl. .................. 264/259; 264/269; 264/154; 264/630; 425/113; 156/89.11

(58) Field of Classification Search ................ 425/113, 425/174.4, 464, 110; 264/154, 259, 269, 264/630; 156/89.11
See application file for complete search history.

(56) References Cited

U.S. PATENT DOCUMENTS

| | | | | |
|---|---|---|---|---|
| 4,557,773 A | * | 12/1985 | Bonzo | ............................ 156/64 |
| 4,715,801 A | * | 12/1987 | Montierth | ..................... 425/110 |
| 5,021,204 A | * | 6/1991 | Frost et al. | ................... 264/630 |
| 2002/0020944 A1 | | 2/2002 | Yamaguchi et al. | |
| 2004/0071932 A1 | | 4/2004 | Ishihara et al. | |
| 2005/0076991 A1 | * | 4/2005 | Fujita | ....................... 156/89.22 |
| 2006/0131782 A1 | * | 6/2006 | Mudd et al. | .................. 264/259 |
| 2006/0249888 A1 | | 11/2006 | Ishihara et al. | |
| 2007/0114700 A1 | * | 5/2007 | Andrewlavage et al. | ...... 264/400 |
| 2008/0006972 A1 | * | 1/2008 | Ichikawa | ..................... 264/630 |
| 2008/0295470 A1 | * | 12/2008 | Ogyu et al. | .................... 55/491 |
| 2009/0008830 A1 | * | 1/2009 | Okazaki et al. | .............. 264/442 |

FOREIGN PATENT DOCUMENTS

| | | |
|---|---|---|
| JP | 2001-300922 A1 | 10/2001 |
| JP | 2002-028915 A1 | 1/2002 |
| JP | 2004-154768 A1 | 6/2004 |
| JP | 2008-055737 A1 | 3/2008 |
| WO | 2006/068767 A2 | 6/2006 |

\* cited by examiner

*Primary Examiner*—Joseph S Del Sole
*Assistant Examiner*—Nahida Sultana
(74) *Attorney, Agent, or Firm*—Burr & Brown

(57) ABSTRACT

A manufacturing apparatus of a plugged honeycomb structure includes a table portion having a through hole into which the end of a honeycomb structure is inserted, positioning means for positioning and holding the honeycomb structure in the through hole of the table portion in such a manner that its end face appears on the side of a first face of the table portion, and a film holding portion fixing the remaining portion of a film on the side of a second face of the table portion. After or before fixing the film, holes corresponding to openings of cells of the honeycomb structure are formed in the film, and a plugging material is filled into the holes, to manufacture the plugged honeycomb structure using the apparatus.

12 Claims, 10 Drawing Sheets

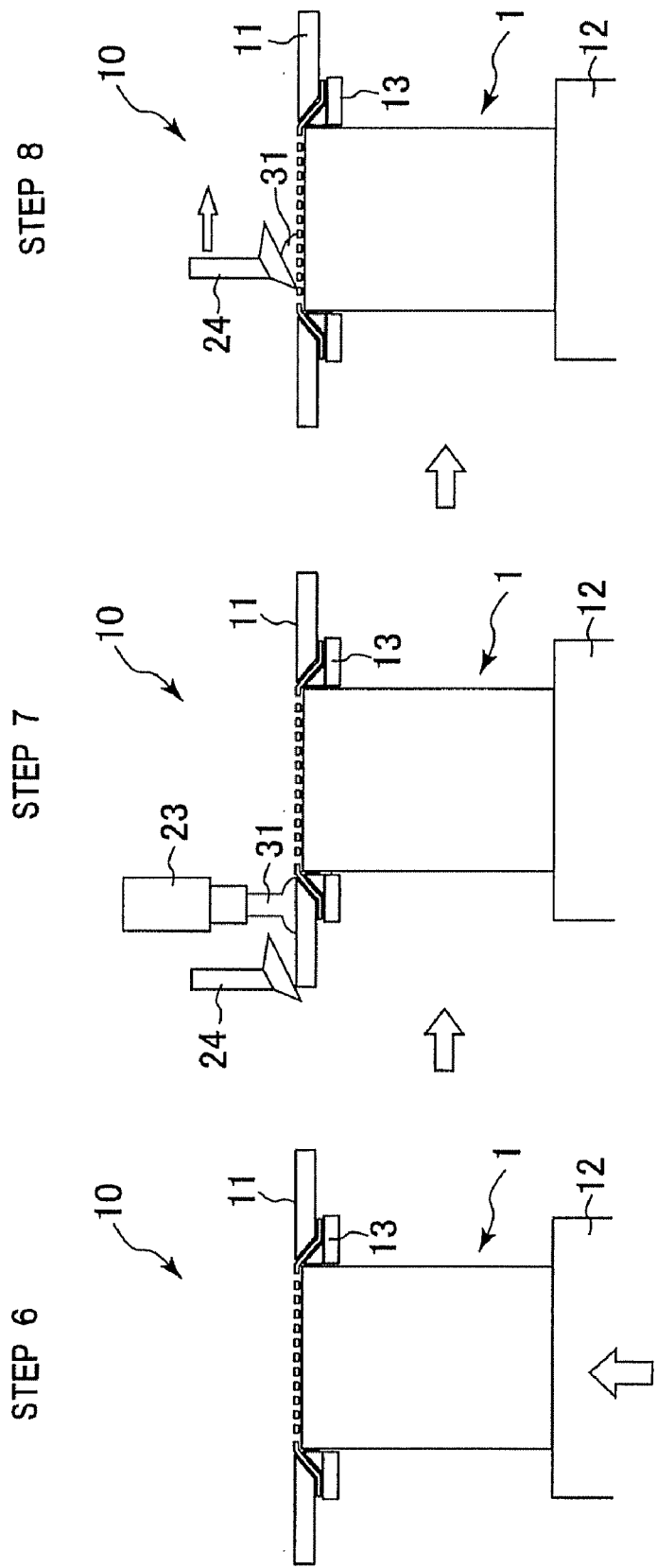

MANUFACTURING APPARATUS OF PLUGGED HONEYCOMB STRUCTURE AND MANUFACTURING METHOD OF THE SAME

BACKGROUND OF THE INVENTION

1. Field of the Invention

The present invention relates to a manufacturing apparatus of a plugged honeycomb structure for forming plugging portions at opening ends of cells of a honeycomb structure, and a manufacturing method of the same.

2. Description of the Related Art

There is an increasing need to remove, from an exhaust gas, fine particles and harmful substances included in the exhaust gas from an internal combustion engine, a boiler or the like, in consideration of an influence on the environment. In particular, a regulation on the removal of the fine particles (hereinafter sometimes referred to as the particulate matter (PM)) exhausted from a diesel engine tends to be strengthened in Europe, the United States and Japan, and a honeycomb structure is used in a collecting filter for removing the PM.

Examples of the filter used for such a purpose include a honeycomb filter using a plugged honeycomb structure in which a plurality of cells constituting flow paths of a fluid is partitioned by partition walls. The structure includes plugging portions which alternately plug one opening end and the other opening end of the plurality of cells. According to such a honeycomb filter, when an exhaust gas G1 is allowed to flow into the cells from the end face of the filter on an exhaust gas inflow side and the exhaust gas G1 passes through the partition walls, particulates in the exhaust gas are collected by the partition walls, so that it is possible to discharge a purified gas G2 from which the particulates have been removed, from the end face of the filter on a purified gas outflow side.

Moreover, as a manufacturing method of the above plugged honeycomb structure, there is suggested, for example, a method including the steps of attaching an adhesive sheet or the like to one end face of a honeycomb structure (an unfired dried ceramic article); making holes only in portions of the adhesive sheet or the like corresponding to the cells to be plugged (plugged cells) by laser processing or the like using image processing to form a mask; immersing, into a slurry (a ceramic slurry), the end face of the honeycomb structure to which the mask has been attached; filling the slurry into the plugged cells of the honeycomb structure to form the plugging portions; subjecting the other end face of the honeycomb structure to a step similar to the above step; and performing drying and firing to obtain the plugged honeycomb structure (e.g., see JP-A-2001-300922).

However, according to the above method of making the holes in the adhesive sheet and immersing, into the slurry, the honeycomb structure provided with this adhesive sheet as the mask, an operation time is required for leveling the slurry for the immersion, which factors into cost increases. Moreover, the leveling is a very delicate step, the outer peripheral portion of the structure thickens or thins owing to even slight deviation, and it is therefore difficult to obtain a uniform plugging depth. A leveling precision agrees with a depth precision, and hence additional labor and time are necessary for the leveling step. Moreover, the film needs to be bent so that the immersed end is not made dirty, but it is not easy to appropriately bend the film. Moreover, it is not easy to peel the bent film attached to the side surface of the structure after the plugging, which hinders automation steps.

SUMMARY OF THE INVENTION

An object of the present invention is to provide a manufacturing apparatus of a plugged honeycomb structure capable of shortening the manufacturing time, thereby decreasing the manufacturing cost, and providing a manufacturing method of the plugged honeycomb structure.

To achieve the above object, the present inventors have found that when inserting the end face of a honeycomb structure covered with a film into a table portion having a through hole so that the end face appears on the side of the first face of the table portion, holding the film on the side of the second face of the table portion on an opposite side to bring the film into close contact with the end face, and forming holes in the film, a plugging material can be filled into cells of the honeycomb structure. That is, according to the present invention, the following manufacturing apparatus of a plugged honeycomb structure, and the manufacturing method of the plugged honeycomb structure can be provided.

[1] A manufacturing apparatus of a plugged honeycomb structure preferably includes a table portion having a through hole into which the end of a honeycomb structure is inserted, the honeycomb structure having porous partition walls and a plurality of cells partitioned by the partition walls to extend through the honeycomb structure from one end face of the honeycomb structure to the other end face thereof; positioning means for moving the table portion or the honeycomb structure to position and hold the honeycomb structure in the through hole of the table portion so that the end face of the honeycomb structure covered with a film appears on the side of the first face of the table portion; and a film holding portion which fixes the remaining portion of the film covering the end face of the honeycomb structure on the side of the second face of the table portion to constitute the film as a mask.

[2] The manufacturing apparatus of the plugged honeycomb structure preferably includes a plugging material supply means for supplying a plugging material having fluidity onto the mask provided with the holes or onto the table portion and a filling means for filling the plugging material supplied onto the mask or the table portion into the cells.

[3] The manufacturing apparatus of the plugged honeycomb structure preferably includes a hole making means for forming holes corresponding to the openings of a part of the cells in the film covering the end face of the honeycomb structure.

[4] The manufacturing apparatus of the plugged honeycomb structure preferably includes that the diameter of the through hole of the table portion on the side of the second face is larger than that on the side of the first face.

[5] The manufacturing apparatus of the plugged honeycomb structure preferably includes that the through hole of the table portion is formed into a tapered manner so that the diameter of the through hole on the side of the second face is larger than that on the side of the first face.

[6] The manufacturing apparatus of the plugged honeycomb structure preferably includes that the through hole of the table portion is formed into a stepped manner to have a stepped portion so that the diameter of the through hole on the side of the second face is larger than that on the side of the first face.

[7] The manufacturing apparatus of the plugged honeycomb structure preferably includes that a height from the first face of the table portion to the tip face of the film holding portion on the side of the first face in a thickness direction is in a range of 0 to 20 mm.

[8] The manufacturing apparatus of the plugged honeycomb structure preferably includes that the film holding portion on an inner diameter side to position the honeycomb structure is provided with a protruding portion which protrudes on the side of the table portion.

[9] The manufacturing apparatus of the plugged honeycomb structure preferably includes that the film holding portion is formed into a shape matched with the second face of the table portion, and the film is sandwiched and fixed between the film holding portion and the second face.

[10] The manufacturing apparatus of the plugged honeycomb structure preferably includes that the positioning means positions the honeycomb structure at a first position where the end of the honeycomb structure is inserted into the through hole of the table portion, and positions the honeycomb structure at a second position where the honeycomb structure is relatively moved to the side of the first face so that the film fixed on the side of the second face of the table portion is brought into close contact with the end face of the honeycomb structure.

[11] A manufacturing method of a plugged honeycomb structure to plug cells of a honeycomb structure having porous partition walls and a plurality of cells partitioned by the partition walls to extend through the honeycomb structure from one end face of the honeycomb structure to the other end face thereof, the method comprising the steps of: inserting the end of the honeycomb structure into a through hole of a table portion having the through hole to position the honeycomb structure so that the end face of the honeycomb structure covered with a film appears on the side of the first face of the table portion; fixing the remaining portion of the film which does not cover the end face on the side of the second face of the table portion to hold the film, and constituting the film provided with holes corresponding to openings of a part of the cells as a mask or making holes in the film to constitute the film as the mask; supplying a plugging material having fluidity onto the mask or the same plane as the mask; and filling the plugging material into the cells of the honeycomb structure.

[12] The manufacturing method of the plugged honeycomb structure preferably includes sandwiching the film between the second face of the table portion and a movable film holding portion to fix the film on the side of the second face of the table portion.

[13] The manufacturing method of the plugged honeycomb structure preferably includes fixing the film on the side of the second face of the table portion; and relatively moving the honeycomb structure to the side of the first face to bring the film into close contact with the end face of the honeycomb structure.

The positioning means can position the honeycomb structure and the table portion while the end of the honeycomb structure is inserted into the through hole of the table portion. Moreover, the film holding portion can fix the remaining portion of the film covering the end face of the honeycomb structure on the side of the second face of the table portion. In consequence, the plugging material can be filled through the film holes into the cells of the honeycomb structure, to manufacture the plugged honeycomb structure. The cells can be plugged without folding the film, and hence the film can easily be peeled later. This step can be automated. Moreover, the shape of the through hole of the table portion or the protruding portion of the film holding portion is contrived and provided with a tapered portion or the like, whereby the amount of the plugging material for use can be decreased as compared with a conventional technology. Therefore, the use ratio of the plugging material can be improved, and the number of replenishing times of the plugging material into the apparatus can be decreased. Furthermore, since the plugging material can be supplied onto the film, the plugging material hardly leaks to the apparatus or the like, and dirt on the apparatus or the like can be prevented. Plugging fluctuations are not easily generated, the generation of defective products is decreased, and the ratio of satisfactory products can be increased.

BRIEF DESCRIPTION OF THE DRAWINGS

FIG. 7C is a diagram for explaining the plugging step following FIG. 7B;

DESCRIPTION OF REFERENCE NUMERALS

1: honeycomb structure, 2: partition wall, 3: cell, 8: end face, 10: manufacturing apparatus, 11: table portion, 11$a$: first face, 11$b$: second face, 11$h$: through hole, 11$s$: tapered face, 12: support base, 13: film holding portion, 13$a$: tip face, 13$h$: through hole, 13$s$: tapered face, 13$t$: protruding portion, 14: guide portion, 15: imaging apparatus, 16: laser, 23: plugging material supply apparatus, 24: filling apparatus, 24$s$: pressurizing face, 25: film, 31: plugging material, and 32: plugging portion.

DETAILED DESCRIPTION OF THE INVENTION

Hereinafter, embodiments of the present invention will be described with reference to the drawings. The present invention is not limited to the following embodiments, and can be changed, modified or improved without departing from the scope of the present invention.

Figure 1:
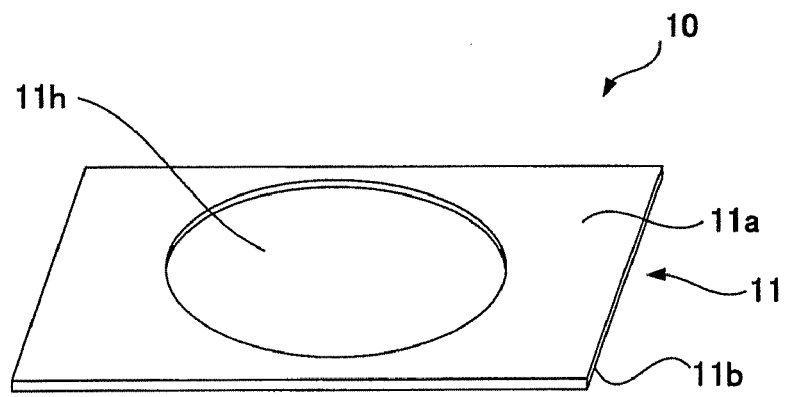
FIG. 1 is a perspective view showing a manufacturing apparatus of a plugged honeycomb structure of the present invention.
Figure 1:
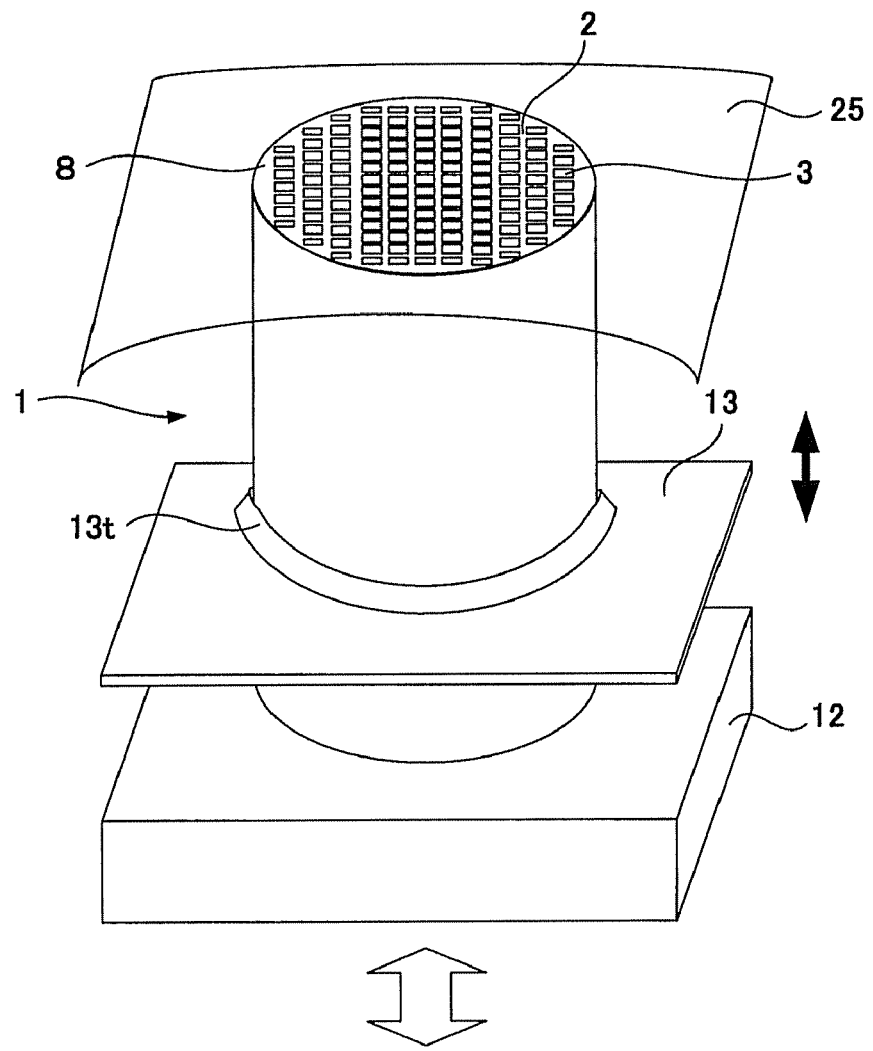

FIG. 1 shows a manufacturing apparatus 10 of a plugged honeycomb structure of the present invention. The manufacturing apparatus 10 of the plugged honeycomb structure includes a table portion 11 having a through hole 11$h$ for inserting the end of a honeycomb structure 1, positioning means for positioning and holding the honeycomb structure 1 in the through hole 11h of the table portion 11 so that an end face 8 appears on the side of a first face 11a, and a film holding portion 13 which fixes the remaining portion of a film 25 on the side of a second face 11b of the table portion 11.

Figure 2A:
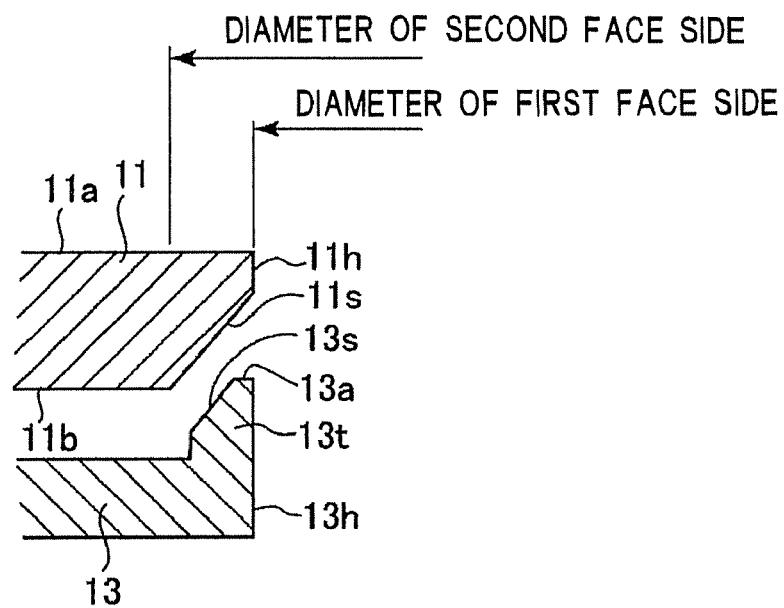
FIG. 2A is a partially enlarged sectional view of a table portion and a film holding portion of Embodiment 1.

The table portion 11 is formed into a plate-like shape, and is provided with the through hole 11h for inserting the honeycomb structure 1. The diameter of the through hole 11h on the side of the second face 11b is larger than that on the side of the first face 11a. Specifically, as shown in FIG. 2A, the through hole 11h is formed into a tapered manner so that the diameter of the through hole on the side of the second face 11b is larger than that on the side of the first face 11a. As described later, a plugging material 31 having fluidity can be supplied onto the first face 11a of the table portion 11 to fill the plugging material 31 into cells 3 by use of a filling apparatus 24.

As the positioning means, in the embodiment shown in FIG. 1, a vertically movable support base 12 is disposed. The honeycomb structure 1 is mounted on the support base 12, and is raised, whereby the honeycomb structure 1 is inserted into the through hole 11h of the table portion 11, and can be positioned so that the end face 8 of the honeycomb structure appears on the side of the first face 11a (the upper surface) of the table portion 11 (see FIG. 2B). It is to be noted that the positioning means can have a constitution in which the support base 12 is movable, but the table portion 11 may be vertically movable so as to lower the table portion 11, whereby the honeycomb structure 1 can be positioned on the table portion 11. That is, the table portion 11 and the honeycomb structure 1 may be relatively movable.

Figure 2B:
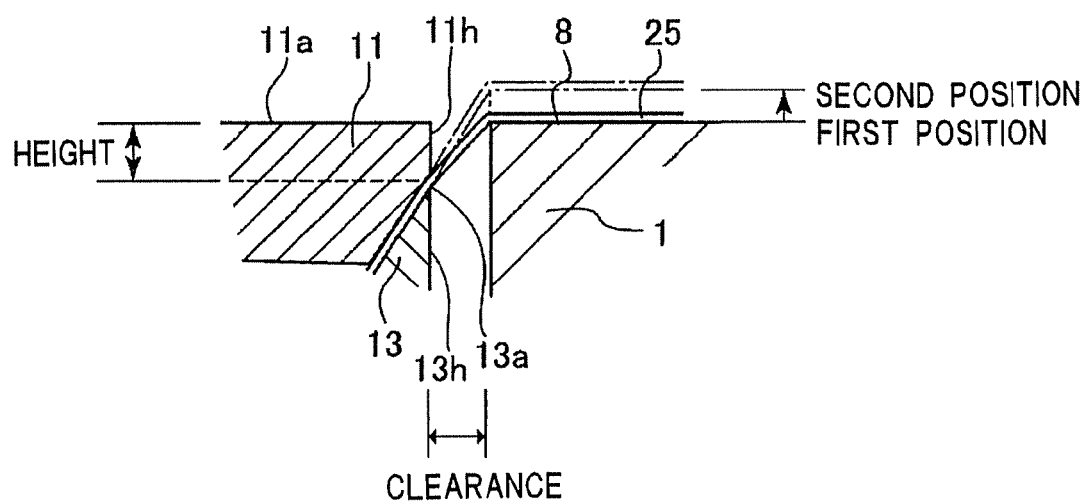
FIG. 2B is a diagram for explaining movement from a first position to a second position.

The film holding portion 13 is provided with a protruding portion 13t and formed into a shape matched with the second face 11b (the lower surface) of the table portion 11. The film holding portion is vertically movable, and has a function of sandwiching the remaining portion of the film 25 covering the end face 8 of the honeycomb structure 1 positioned on the table portion 11 between the film holding portion and the second face 11b of the table portion 11, whereby the film 25 is brought into close contact with and fixed to the end face 8 of the honeycomb structure 1. Specifically, as shown in FIG. 2A, the film holding portion 13 is provided with a through hole 13h for inserting the end of the honeycomb structure 1, and the protruding portion 13t protruding upwardly at an inner end in the diametric direction of the through hole 13h. The protruding portion 13t is provided with a tapered face 13s to be matched with a tapered face 11s of the through hole 11h of the table portion 11. After sandwiching and fixing the film 25 between the film holding portion 13 and the table portion 11, as shown in FIG. 2B, the honeycomb structure 1 is moved from a first position to a second position, whereby the film 25 can be further brought into close contact with the end face 8. Since the film 25 is sandwiched and fixed between the film holding portion 13 and the table portion 11, unlike a conventional example, the film 25 does not have to be folded and brought into close contact with the honeycomb structure 1, and the film 25 can be easily attached/detached. It is to be noted that the protruding portion 13t may be formed integrally with the film holding portion 13, but may also be separately formed and combined when used.

When the film 25 is sandwiched between the table portion 11 and the film holding portion 13, a height from a tip face 13a of the film holding portion 13 on the side of the first face 11a, in a thickness direction to the first face 11a of the table portion 11 (see FIG. 2B), may be in a range of 0 to 20 mm. According to such a constitution, when the plugging material 31 is supplied onto the film 25, the amount of the plugging material 31 to be accumulated on the film 25, in the through hole 13h, can be decreased as much as possible.

Figure 3:
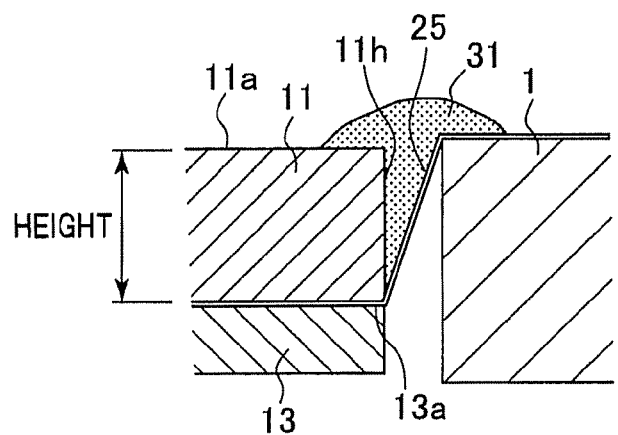
FIG. 3 is a diagram for explaining a disadvantage in case of a large height.

On the other hand, as shown in FIG. 3, when the height of the first face 11a of the table portion 11 with respect to the tip face 13a of the film holding portion 13 exceeds 20 mm, the plugging material 31 is accumulated on the film 25 in the through hole 11h. When the cells are plugged by the filling apparatus 24, as described later (see FIG. 8), the plugging material 31 cannot be filled into the cells 3 with sufficient pressure.

A horizontal clearance (see FIG. 2B) between the film holding portion 13 and the honeycomb structure 1 is preferably 20 mm or less. When the clearance is 20 mm or more, the plugging material 31 is excessively accumulated, and the plugging material 31 adheres to the honeycomb structure 1 after releasing the held film.

The material of at least one of the faces of the film holding portion 13 and the table portion 11 for sandwiching the film 25 is preferably urethane having a hardness of 60 to 90° (JIS K 6253 (Durometer Type A)). Moreover, a corresponding resin may be used. In a case where the film holding portion 13 or the table portion 11 is made of a metal, urethane or the like may be attached to the face of the portion which comes in contact with the film 25. When the material having this hardness is used, the film 25 can be fixed without any gap, and sufficient pressure can be applied. When the hardness is 90° or more, or the portions are both made of metal, the film 25 breaks down or partially contacts, and cannot be sufficiently fixed. When the hardness is 60° or less, the deformation amount is excessively large, the holding force becomes short, and hence sufficient pressure cannot be applied.

The film 25 has a thickness of preferably 15 to 100 μm. In this range, the pressure can sufficiently be applied to the plugging material when filled. When the thickness is larger than 100 μm, the film to be fixed creases due to a shortage of flexibility, and the plugging material 31 leaks. When the thickness is smaller than 15 μm, sufficient pressure cannot be applied due to a shortage of strength.

Figure 4:
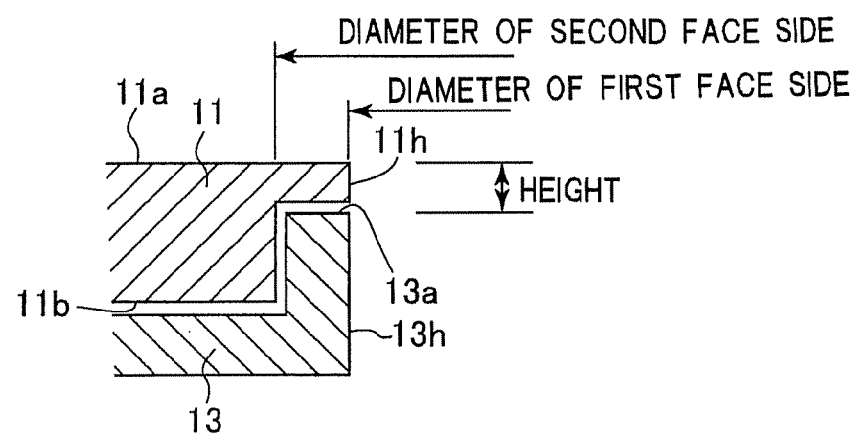
FIG. 4 is a partially enlarged sectional view of a table portion and a film holding portion of Embodiment 2.

Next, another embodiment of the shape of the table portion 11 and the film holding portion 13 will be described. As shown in FIG. 4, the through hole 11h of the table portion 11 has a stepped portion so that the diameter of the through hole on the second face 11b side is larger than that on the first face 11a side. That is, the through hole is formed in a stepped manner.

Figure 5:
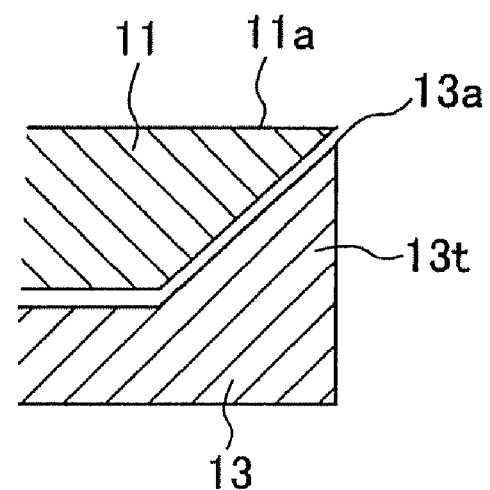
FIG. 5 is a partially enlarged sectional view of a table portion and a film holding portion of Embodiment 3.
Figure 6:
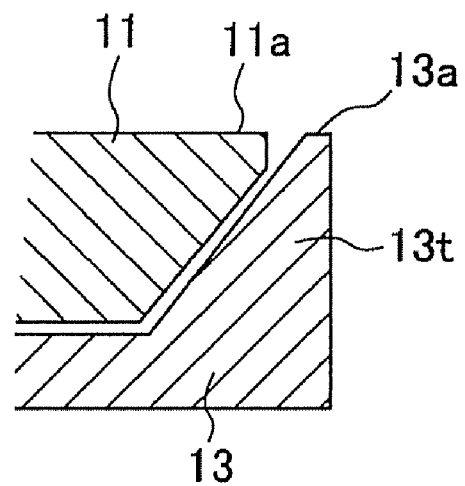
FIG. 6 is a partially enlarged sectional view of a table portion and a film holding portion of Embodiment 4.

Moreover, as shown in FIGS. 5 and 6, the tip of the protruding portion 13t protruding upwardly at the inner end of the film holding portion 13 in the diametric direction may be formed in the vicinity of the first face 11a of the table portion 11 or in the same plane as the first face 11a. It is to be noted that when the tip of the protruding portion 13t is pointed as shown in FIG. 5, the ridge line portion of the protruding portion is considered as the tip face 13a. Furthermore, FIG. 6 shows a case where the height from the tip face 13a of the film holding portion 13 to the first face 11a of the table portion 11 is 0 mm. With the tapered shape or the shape having the stepped portion, unlike FIG. 3, the plugging material 31 is not accumulated on the film 25 in the through hole 11h, and sufficient pressure can be applied to the plugging material 31 to fill the plugging material.

The manufacturing apparatus 10 of the plugged honeycomb structure of the present invention may include plugging material supply means for supplying the plugging material 31 having the fluidity onto the mask provided with the holes or the table portion 11; and filling means for filling the plugging material 31 supplied onto the mask or the table portion 11 into the cells 3. According to such a constitution, a manufacturing line can be automated.

As the plugging material supply means, the manufacturing apparatus includes a plugging material supply apparatus 23 which supplies the plugging material 31 having the fluidity onto the mask or the table portion 11 (see FIG. 7C). The plugging material 31 (the slurry) used for plugging the cells is formed by adding water as a dispersion medium to a mixture of ceramic power, a binder and a deflocculant to mix the same. It is to be noted that as a ceramic material, cordierite, mullite, alumina, silicon carbide or the like may be used.

Figure 8:
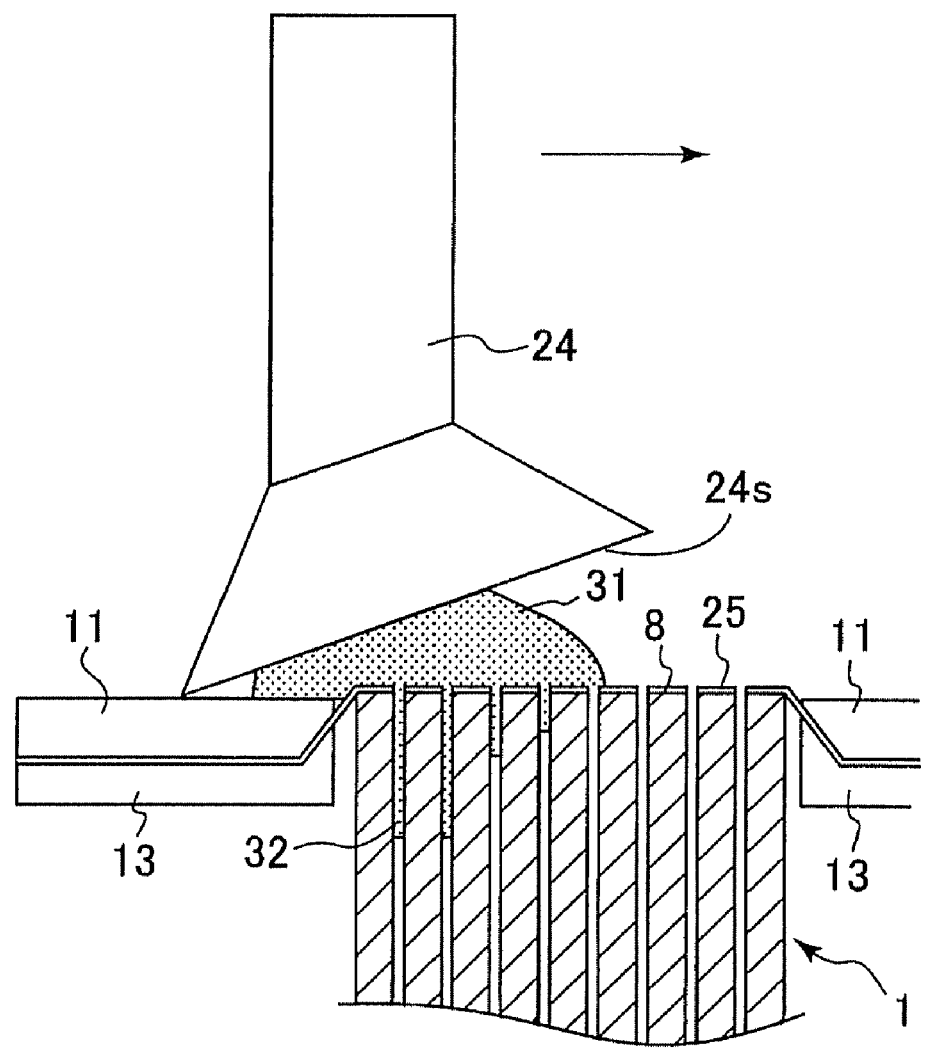
FIG. 8 is a diagram for explaining the filling of a plugging material.

As the filling means, the manufacturing apparatus includes a filling apparatus 24 having a pressurizing face 24s which is arranged at an acute angle with respect to the surface of the mask to pressurize the plugging material 31, whereby the plugging material 31 is filled into the cells 3 through mask holes, while the filling apparatus moves on the table portion 11 or the mask (see FIG. 8).

Furthermore, the manufacturing apparatus 10 of the plugged honeycomb structure includes hole making means for forming holes corresponding openings of a part of the cells 3 in the film 25 covering the end face 8 of the honeycomb structure 1 to constitute the film 25 as the mask. It is to be noted that the hole making means is not disposed in the manufacturing apparatus 10 but that the holes may be made in another manufacturing line.

Figure 7A:
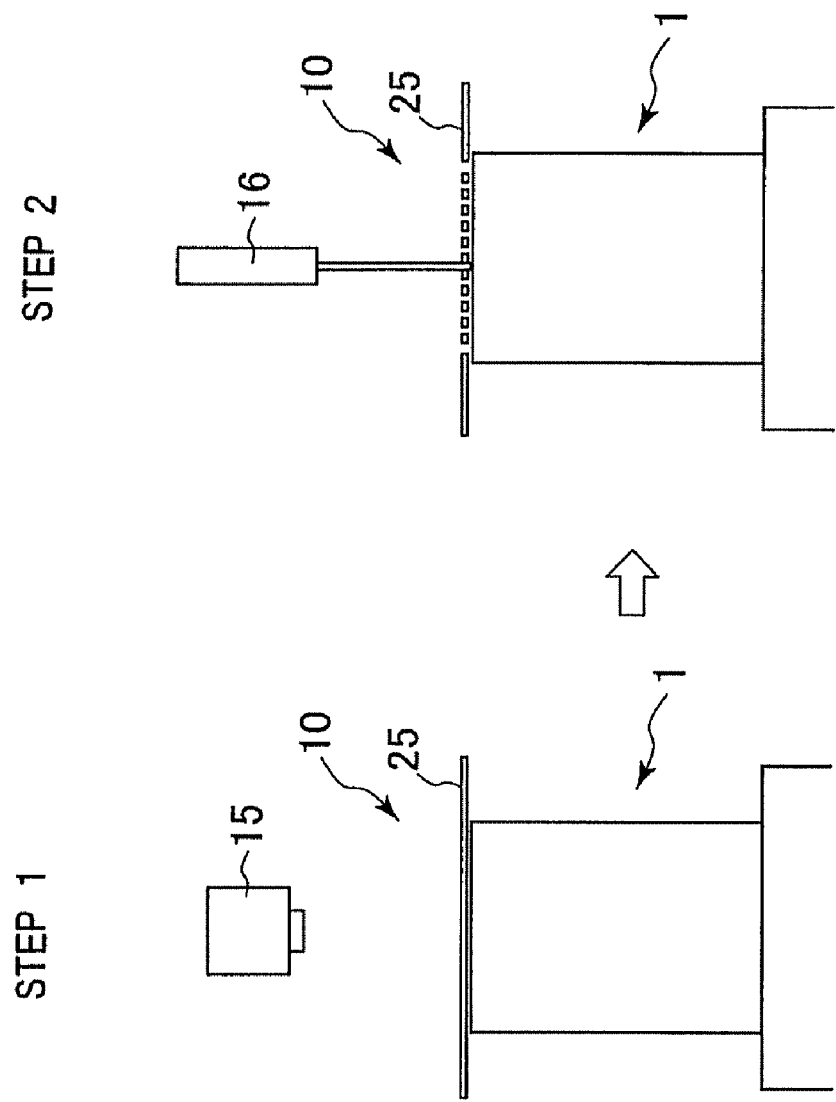
FIG. 7A is a diagram for explaining a plugging step.

As the hole making means, the manufacturing apparatus includes an imaging apparatus 15 for picking up the image of the end face 8 of the honeycomb structure 1, and a laser 16 for forming the holes in the film based on image data picked up the imaging apparatus 15 (see FIG. 7A). There is not any special restriction on the imaging apparatus 15, and, for example, a charge-coupled device (CCD) camera, an X-ray computed tomography (CT) scanner or the like is preferably usable.

As shown in, for example, FIG. 1, the honeycomb structure 1 to be plugged has porous partition walls 2, and the plurality of cells partitioned by the partition walls 2 to extend through the honeycomb structure from the one end face 8 to the other end face 8, and the honeycomb structure is formed of a ceramic material. More specifically, from the viewpoints of strength, thermal resistance and the like, the honeycomb structure includes the ceramic material selected from the group consisting of cordierite, mullite, alumina, silicon carbide and/or a combination of them.

Moreover, a binder, an organic pore former, a surfactant, water and the like are added to the above raw material to prepare a kneaded clay having plasticity, and the clay is, for example, extrusion-formed into the columnar honeycomb structure 1 having a large number of cells 3 partitioned by the partition walls 2 to extend through the honeycomb structure in an axial direction.

Next, a manufacturing method of the plugged honeycomb structure by use of the manufacturing apparatus 10 of the plugged honeycomb structure of the present invention is described with reference to FIGS. 7A to 7C. First, the holes corresponding to the openings of a part of the cells 3 are formed in the film 25 to constitute the film 25 as the mask. Specifically, as shown in FIG. 7A, the film 25 is attached to the end face 8 of the honeycomb structure 1, and the end face 8 is imaged by the imaging apparatus 15 to acquire image data capable of specifying the shapes and positions of the cells 3 to be plugged and the cells 3 which are not to be plugged (a step 1). Next, the holes corresponding to the openings of the part of the cells 3 that are formed in the film 25 by the laser 16 based on the image data acquired by the previous step to constitute the mask (a step 2). Therefore, the imaging apparatus 15 and the laser 16 constitute the hole making means. It is to be noted that the manufacturing apparatus 10 may be provided with the hole making means to perform these steps, or the steps may be performed by another apparatus.

Figure 7B:
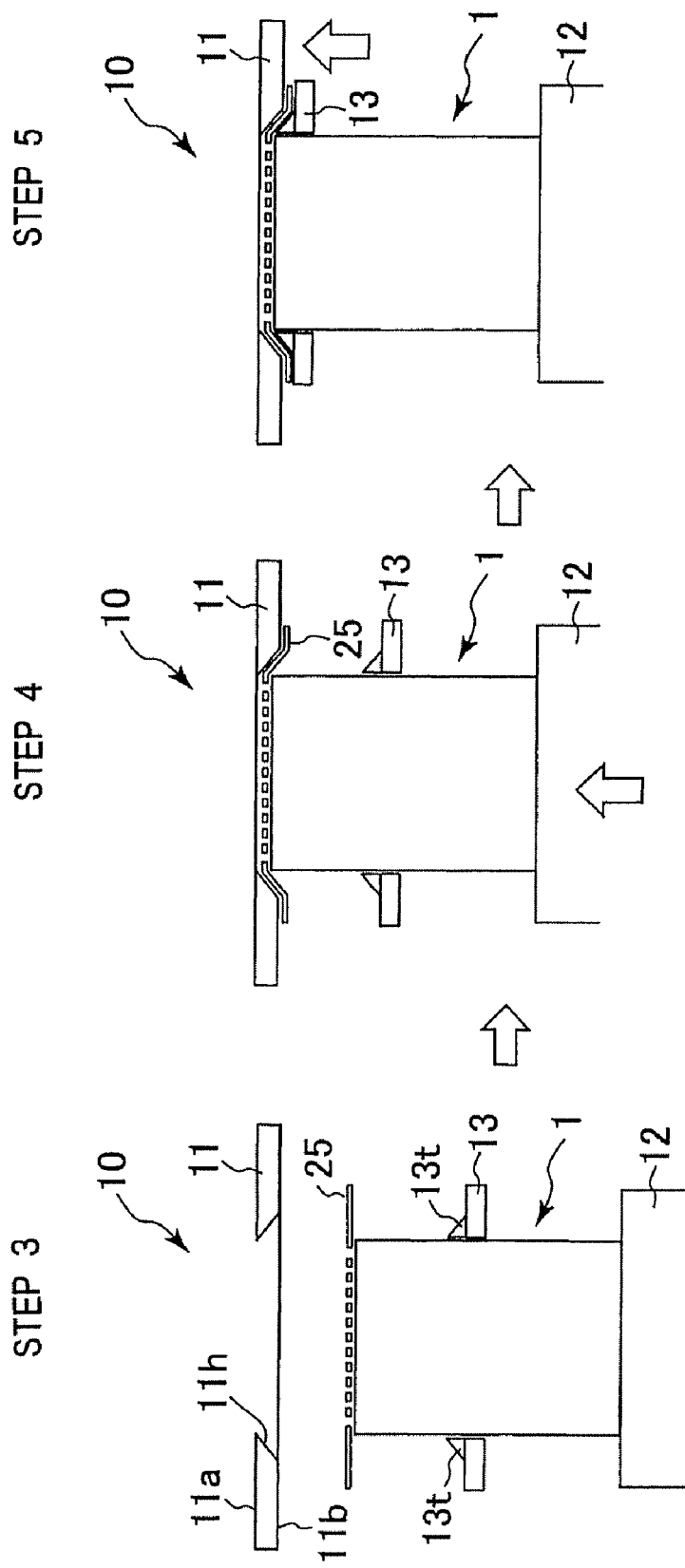
FIG. 7B is a diagram for explaining the plugging step following FIG. 7A.

Next, as shown in FIG. 7B, the honeycomb structure 1 is mounted on the support base 12 (a step 3). Then, the support base 12 is raised to insert the end of the honeycomb structure 1 into the through hole 11h of the table portion 11 (a step 4). That is, the end of the honeycomb structure 1 is inserted into the table portion 11, and the honeycomb structure 1 is positioned at the first position so that the end face 8 of the honeycomb structure covered with the film 25 appears on the side of the first face 11a of the table portion 11 (see FIG. 2B).

Then, the film holding portion 13 is raised to sandwich and fix the film between the film holding portion 13 and the table portion 11 (a step 5). That is, the remaining portion of the film 25 which does not cover the end face 8 is fixed on the side of the second face 11b of the table portion 11, whereby the film 25 is brought into close contact with and held by the end face 8 of the honeycomb structure 1. More specifically, the film 25 is sandwiched between the second face 11b of the table portion 11 and the movable film holding portion 13.

It is to be noted that in the steps 4 and 5, after raising the honeycomb structure 1 (the support base 12), the film holding portion 13 may be raised, but the honeycomb structure 1 (the support base 12) is more preferably raised simultaneously with the film holding portion 13. When the support base 12 is raised to insert the honeycomb structure 1 into the through hole 11h of the table portion 11, the film 25 is deformed. When the film holding portion 13 is raised later, the end of the film 25 cannot be correctly caught sometimes.

After fixing the film 25 on the side of the second face 11b of the table portion 11, as shown in FIG. 7C, the honeycomb structure 1 is relatively moved to the first face 11a side, whereby the honeycomb structure is positioned at the second position where the end face 8 is exposed on the first face 11a side of the table portion 11, and the film 25 is brought into close contact with the end face 8 of the honeycomb structure 1 (a step 6). That is, as shown in FIG. 2B, after fixing the film, the support base 12 is further raised to raise the honeycomb structure 1, or the table portion is lowered, and the film 25 is brought into close contact with the end face 8 so that the end face 8 of the honeycomb structure 1 is slightly higher than the first face 11a of the table portion 11.

Moreover, the plugging material 31 having the fluidity is supplied onto the mask or the same plane as the mask, and then the plugging material 31 is filled into the cells 3 of the honeycomb structure 1. Specifically, as shown in FIG. 7C, the plugging material 31 (the slurry) having the fluidity is supplied onto the mask (the film 25) provided with the holes or the table portion 11 by the plugging material supply apparatus 23 as the plugging material supply means (a step 7).

Next, the plugging material 31 supplied onto the mask or the table portion 11 is filled into the cells 3 by the filling apparatus 24 as the filling means (a step 8). An enlarged diagram is shown in FIG. 8. The filling apparatus 24 has the pressurizing face 24s arranged at the acute angle with respect to the surface of the mask to pressurize the plugging material 31, and moving means which moves on the table portion 11. After supplying the plugging material 31 onto the mask of the honeycomb structure 1 positioned with respect to the table portion 11 or onto the table portion 11, the filling apparatus 24 moves on the table portion 11, whereby the plugging material 31 supplied onto the mask is pressurized by the pressurizing face 24s, then the plugging material 31 is filled into the cells 3 of the honeycomb structure 1 to form plugging portions 32.

It is to be noted that the making of the holes in the film 25 (steps 1 and 2) may be performed after the step 6.

Figure 9A:
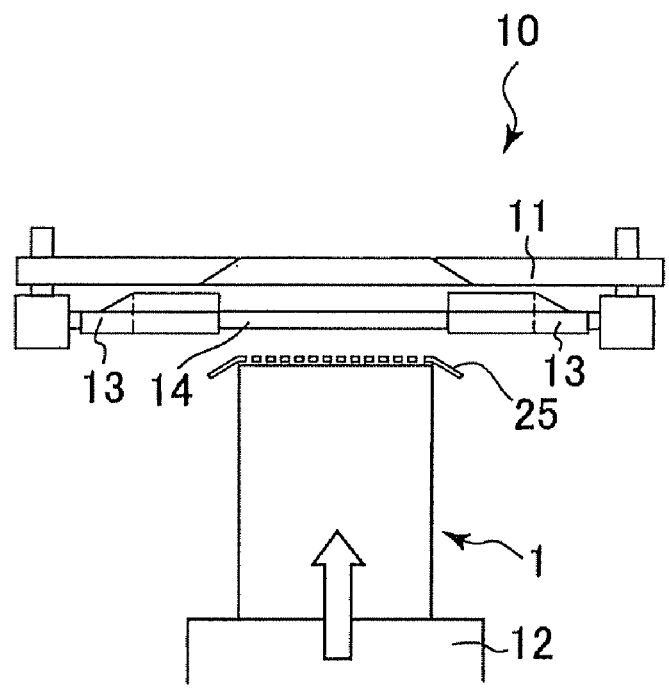
FIG. 9A is a diagram for explaining a film holding portion of another embodiment.
Figure 9B:
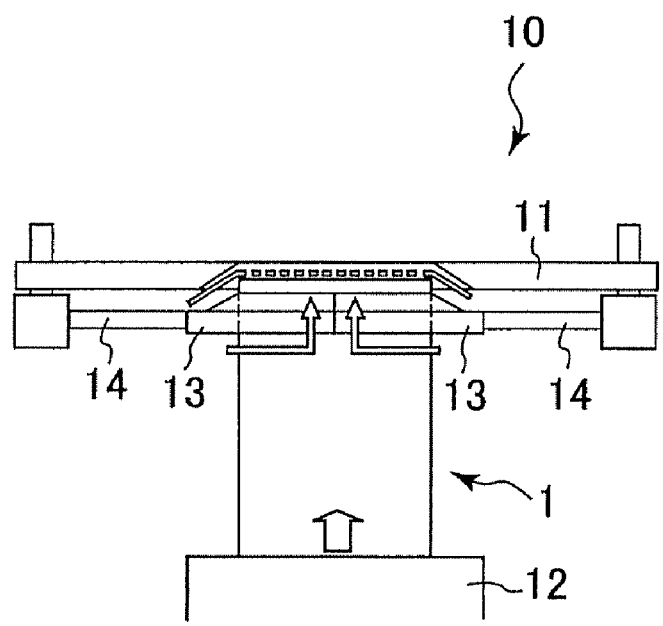
FIG. 9B is a diagram for explaining the film holding portion of the other embodiment following FIG. 9A.

Another embodiment of the film holding portion will be described with reference to FIGS. 9A and 9B. In the present embodiment, a film holding portion 13 is integrally disposed under a table portion 11. As shown in FIG. 9A, the film holding portion 13 is divided into a plurality of portions (two portions in FIG. 9A) and held by guide portions 14 while the film holding portion has a gap for inserting a honeycomb structure 1. A support base 12 is raised to insert the end of the honeycomb structure 1 into the through hole 11h of the table portion 11, and then, as shown in FIG. 9B, the film holding portions 13 are slid along the guide portions 14. Subsequently, the guide portions 14 are raised, whereby the remaining portion of a film 25 covering the end face 8 of the honeycomb structure 1 can be fixed by the table portion 11 and the film holding portion 13. Afterward, the support base 12 is slightly raised to bring the film 25 into close contact with an end face 8 of the honeycomb structure 1.

EXAMPLES

Hereinafter, the present invention will be described in more detail based on examples, but the present invention is not limited to these examples.

A ceramic material as a main raw material selected from the group consisting of cordierite, mullite, alumina, silicon carbide and a combination of them was blended with water and a binder, dispersed, mixed and kneaded to obtain a formed material. The material was extruded into a columnar shape by a clay kneader, and extrusion-formed by an extrusion forming machine to obtain a honeycomb structure having a cell dimension of 2 mm×2 mm and a pitch of 3 mm.

Next, a plurality of cells of both end faces of the resultant honeycomb structure were alternately plugged by use of a manufacturing apparatus having a film holding portion 13 described above with reference to FIG. 5 in plugging steps of FIGS. 7A to 7C. The material of the film holding portion 13 was urethane rubber (hardness: 90°), the film holding portion 13 had a height of 10 mm and a clearance of 3 mm, and a used film had a thickness of 75 μm. As shown in FIG. 8, a pressure applied during filling shown in FIG. 8 (an air pressure during the pressurizing of a filling apparatus 24 by a cylinder in a vertical direction) was 0.4 MPa, and the filling apparatus had a speed (a squeegee speed) of 50 mm/sec.

When the filling was performed on the above conditions, the average value of the depths of the plugging portions 32 was 4.2 mm, and a depth fluctuation a at that time could be suppressed to a low value of 0.32 mm.

The manufacturing apparatus and manufacturing method of the honeycomb structure according to the present invention can preferably be utilized as means for preparing the plugged honeycomb structure for use as a carrier for a catalyst apparatus or a filter such as a DPF.

The invention claimed is::

1. A manufacturing apparatus of a plugged honeycomb structure, comprising: a table portion having a through hole into which the end of a honeycomb structure is inserted, the honeycomb structure having porous partition walls and a plurality of cells partitioned by the partition walls to extend through the honeycomb structure from one end face of the honeycomb structure to the other end face thereof; positioning means for moving the table portion or the honeycomb structure to position and hold the honeycomb structure in the through hole of the table portion so that the end face of the honeycomb structure covered with a film appears on the side of the first face of the table portion; a film holding portion having a protruding portion which fixes the remaining portion of the film covering the end face of the honeycomb structure, wherein said protruding portion axially overlaps the side of the second face of the table portion to pinch and secure the film as a mask; and plugging material supply means for supplying a plugging material having fluidity onto the mask provided with holes or onto table portion; and filling means for filling the plugging material supplied onto the mask or the table portion into the cells.

2. The manufacturing apparatus of the plugged honeycomb structure according to claim 1, further comprising:
hole making means for forming holes corresponding to openings of a part of the cells in the film covering the end face of the honeycomb structure.

3. The manufacturing apparatus of the plugged honeycomb structure according to claim 1, wherein the diameter of the through hole of the table portion on the side of the second face is larger than that on the side of the first face.

4. The manufacturing apparatus of the plugged honeycomb structure according to claim 3, wherein the through hole of the table portion is formed into a tapered manner so that the diameter of the through hole on the side of the second face is larger than that on the side of the first face.

5. The manufacturing apparatus of the plugged honeycomb structure according to claim 3, wherein the through hole of the table portion is formed into a stepped manner to have a stepped portion so that the diameter of the through hole on the side of the second face is larger than that on the side of the first face.

6. The manufacturing apparatus of the plugged honeycomb structure according to claim 1, wherein a height from the first face of the table portion to the tip face of the film holding portion on the side of the first face in a thickness direction is in a range of 0 to 20 mm.

7. The manufacturing apparatus of the plugged honeycomb structure according to claim 1, wherein the film holding portion on an inner diameter side to position the honeycomb structure is provided with a protruding portion which protrudes on the side of the table portion.

8. The manufacturing apparatus of the plugged honeycomb structure according to claim 1, wherein the film holding portion is formed into a shape matched with the second face of the table portion, and the film is sandwiched and fixed between the film holding portion and the second face.

9. The manufacturing apparatus of the plugged honeycomb structure according to claim 1, wherein the positioning means positions the honeycomb structure at a first position where the end of the honeycomb structure is inserted into the through hole of the table portion, and positions the honeycomb structure at a second position where the honeycomb structure is relatively moved to the side of the first face so that the film fixed on the side of the second face of the table portion is brought into close contact with the end face of the honeycomb structure.

10. A manufacturing method of a plugged honeycomb structure to plug cells of a honeycomb structure having porous partition walls and a plurality of cells partitioned by the partition walls to extend through the honeycomb structure from one end face of the honeycomb structure to the other end face thereof, the method comprising the steps of: inserting the end of the honeycomb structure into a through hole of a table portion having the through hole to position the honeycomb structure so that the end face of the honeycomb structure covered with a film appears on the side of the first face of the table portion; using a film holding portion having a protruding portion that axially overlaps the side of the second face of the table portion to pinch and secure the remaining portion of the film which does not cover the end face on the side of the second face of the table portion to hold the film, and constituting the film provided with holes corresponding to openings of a part of the cells as a mask or making holes in the film to constitute the film as the mask; supplying a plugging material having fluidity onto the mask or the same plane as the mask; and filling the plugging material into the cells of the honeycomb structure.

11. The manufacturing method of the plugged honeycomb structure according to claim 10, further comprising the steps of: sandwiching the film between the second face of the table portion.

12. The manufacturing method of the plugged honeycomb structure according to claim 10, further comprising the step of: fixing the film on the side of the second face of the table portion; and relatively moving the honeycomb structure to the side of the first face to bring the film into close contact with the end face of the honeycomb structure.

* * * * *

UNITED STATES PATENT AND TRADEMARK OFFICE
CERTIFICATE OF CORRECTION

PATENT NO.        : 7,807,085 B2                                            Page 1 of 1
APPLICATION NO. : 12/408921
DATED             : October 5, 2010
INVENTOR(S)       : Hiroyuki Tsuji et al.

It is certified that error appears in the above-identified patent and that said Letters Patent is hereby corrected as shown below:

Column 10
    *Line 7*: add --the-- before "table"

Column 12
    *Line 2*: add a new paragraph consisting of --and a movable film holding portion to fix the film on the side of the second face of the table portion.--

Signed and Sealed this

Thirtieth Day of November, 2010

David J. Kappos
*Director of the United States Patent and Trademark Office*